United States Patent [19]

Levanti

[11] 4,163,317

[45] Aug. 7, 1979

[54] KNIFE ASSEMBLY

[76] Inventor: August Levanti, 562 Luton Dr., Glendale, Calif. 91206

[21] Appl. No.: 849,003

[22] Filed: Nov. 7, 1977

[51] Int. Cl.² ............................................. A47J 17/04
[52] U.S. Cl. .................................................. 30/123.7
[58] Field of Search ............... 30/279 R, 123.7, 123.5, 30/164.9, 346

[56] References Cited

U.S. PATENT DOCUMENTS

| 700,617 | 5/1902 | Cobaugh | 30/123.7 |
|---|---|---|---|
| 706,107 | 8/1902 | Prentiss | 30/123.7 |
| 2,570,002 | 10/1951 | McMillen | 30/279 R |
| 2,692,428 | 10/1954 | Morishita | 30/123.7 |
| 3,149,417 | 9/1964 | Lowry | 30/123.7 X |
| 3,237,299 | 3/1966 | Gibbs | 30/123.7 |

FOREIGN PATENT DOCUMENTS 240345  10/1925  United Kingdom .................. 30/279 R Primary Examiner—Jimmy C. Peters
Attorney, Agent, or Firm—Lyon & Lyon

[57] ABSTRACT

Described herein is a novel knife assembly useful in a myriad of kitchen tasks. The article of the invention comprises a blade having a scoring point protruding from the dull edge. Also described is an assembly wherein the blade contains a narrow slit with sharpened opposite edges for peeling.

6 Claims, 1 Drawing Figure

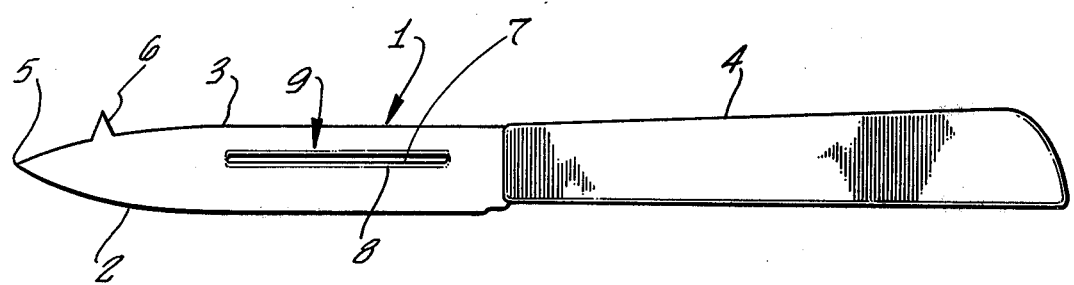

KNIFE ASSEMBLY

Return to the dim recesses of history to the dawn of man. Stealthily stalking his prey, the ape-man meanders through the brush. Armed with an innate determination for survival, he creeps toward his unsuspecting prey resting by the waterhole. In the past, he would have sprung from his cover, but all too frequently, the animal, alerted by the rustling, escaped. Too many lost opportunities spell disaster. Now, a stone rifled from the brush or a rock plummeting from a tree increase the probability of a kill.

Today an antelope intent on quenching his thirst, ignores the crackling of a branch. From his perch the ape-man takes aim. Success! Stunned, the antelope stumbles and before he can regain his balance the ape-man lunges forward ending the hunt. The ape-man's quest, however, has not ended for his journey has lead him far from the rest of the tribe and the antelope is too large for one hunter to carry. The scavengers are already gathering and before he could return with help his efforts would be for naught. Suddenly, he observes how the hide was sheared by the stone's sharp edge. Retrieving his weapon, he severs the choice portions from the carcass. A knife!

This timeless encounter was merely the start of man's relationship with the knife. Throughout the milleniums, however, the basic concept remained unchanged and except for replacing the stone blade with one of metal, the ape-man reincarnated would immediately recognize his old companion. Granted, he would be amazed by its current durability and sharpness but of all his familiar objects, this, perhaps, has changed the least.

Modifications of the basic single bladed knife do, however, exist. These generally comprise modest changes in the blade to adapt it for a particular purpose such as paring or coring fruit. For example, Lovato, U.S. Pat. No. 3,913,226 shows a citrus fruit cutter having a handle with a probe mounted thereon which defines three points along an arc of the citrus fruit radius. A skin cutter of limited depth is positioned along the arc so that the handle and probe engage the citrus. A paring and coring tool is shown in Domack, U.S. Pat. No. 2,079,496. Described is a knife having a blade with curved cross section and a forwardly projecting longitudinal paring edge extending below the convex surface of the blade. There is also an eye scoop on the rear portion of the forward margin of the blade projecting upwardly therefrom and conforming to the curvature of the blade. Woginrich, U.S. Pat. No. 2,291,179 teaches improved paring and coring implements for use as culinary devices. The blade has a concave-convex cross section and terminates in a pointed end having a laterally projecting coring lug extending from one edge. The extension has a scraping blade curving outwardly from its convex side and extends in a longitudinal direction. Central to each of these instruments is the basic configuration developed in the forgotten past. In each instance the advantage is a slight modification to adapt the basic knife to specialized applications.

Absent from the prior art is a multi-faceted knife especially adapted to the particular needs of the cook. Frequently, a chef or even one preparing a meal at home is faced with a number of slicing and peeling operations that must be performed on substances of differing textures. Potatoes, onions, carrots, tomatoes and other vegetables are well known examples. Fruits also embody these characteristics. Consider citrus fruits, apples, avocados and pears, for instance. Another common denominator found in culinary operations that must be compensated for, is the necessity that these operations be performed virtually simultaneously. Precious time is lost in fumbling for the right tool. Besides time factors there are also safety considerations that must be realized. During the flurry of activity that accompanies meal preparation, the constant substitution of equipment for each material provides numerous opportunities for sliced fingers. This may be due to carelessness or even the failure to recall the exact location of the articles. These objections may be eliminated by an instrument which is adapted to many kitchen tasks thus rendering the need for numerous different knives and peelers obsolete. Consequently, there is a need for an instrument that is capable of performing a myriad of culinary tasks on fruits and vegetables of varying textures thus eliminating the need for a number of different tools.

SUMMARY OF THE INVENTION

It is an object of this invention to produce a multipurpose knife useful in preparing numerous fruits and vegetables.

It is also an object of this invention to develop a cutlery instrument that eliminates the cook's reliance on a number of different tools, each specially adapted to one particular task.

BRIEF DESCRIPTION OF THE INVENTION

According to this invention there is provided a novel knife useful in the preparation of food. This knife permits the peeling of fruits and vegetables of varying textures without affecting the consistency of these foodstuffs. The drawing exhibits a side view of the article of this invention.

DETAILED DESCRIPTION OF THE DRAWING

With reference to the drawing, the article of this invention is comprised of a tapered blade 1 having a sharpened edge 2 and a dull edge 3 and handle 4. Protruding from the dull edge 3 toward the tip of the blade 5 is a scoring point 6. This scoring point is preferably about 0.5" from the tip of the blade. The precise distance, however, will naturally depend upon the overall length of the knife. The height of the point will depend on the depth of the score desired and a range of 0.05" to 0.5" is generally satisfactory for most applications. It is preferable that the point be approximately 0.125" from the base to the tip. It enables the skin of the vegetable to be cleanly pierced without damaging the underlying portion. The scoring point is placed in the vicinity of the blade's tip as it provides for easier handling and more accurate scoring of the foodstuff.

On the broad side of blade 1 is a narrow longitudinal slit 7. This slit has a pair of sharpened opposing edges 8 and 9 traversing its length. It is preferable that the opening of the slit be about 0.125"; however, the width may vary within a range of 0.05" and 0.5". This slit may be advantageously employed in peeling such vegetables as carrots and potatoes and such fruits as pears and apples.

The article of this invention is particularly useful in peeling such thin skinned fruits and vegetables as avocados and onions. Avocados are very mushy when ripe and a great deal of difficulty is encountered when the chef attempts to remove the skin without damaging the fruit. The article of this invention with the scoring tip permits easy removal of the skin and solves the problem. Onions are another difficult vegetable to peel. While it lacks the mushy texture of avocados, it is plagued with noxious vapors that disturb the lachrymal glands near the eye creating annoying tears. These tears may be avoided by scoring and peeling the onion by means of this invention.

Besides removing the outer covering from these thin skinned fruits and vegetables, the article of this invention is also useful in removing the casing from salami without damaging the meat. The scoring tip may also be employed in the puncturing of chestnuts. These have a tendency to explode when heated and the article of this invention provides suitable means for venting the gases without damaging the meat or opening the shell to such a degree that the heart of the nut is subjected to burning.

In addition to the previously noted advantages attendant the use of this invention, it should be noted that this article may be successfully employed in deveining shrimp by means of the scoring point. Furthermore, tomatoes may have their skin easily removed if the skin is scored prior to scalding. When oranges are slit with the scoring point, the skin is removed without squeezing out the precious nectar. Cooking with garlic, a truly fulsome material, can be an unwelcome chore but the ordinary difficulties in its handling may be avoided if it is first scored on both sides thus permitting the skin to fall off revealing the choice portions.

In addition to these numerous advantages, the article of this invention may also be advantageously employed in the opening of cartons without slitting the interior boxes. Quite surprisingly, it may also be used in the grafting of citrus trees where only a shallow cut is to be made.

While embodiments and applications of this invention have been shown and described, it will be apparent to those skilled in the art that many more modifications are possible without departing from the inventive concepts herein described. The invention, therefore, is not to be restricted except as it is necessary by the prior art and by the spirit of the appended claims.

I claim:

1. A knife having a handle and a blade with sharpened and dull substantially smooth edges, said edges tapering to form a point, said dull edge having a point near the tip of said blade for scoring and piercing, said scoring and piercing point defined by opposing tapering straight edges protruding from said dull edge of said blade as a substantially equal angle to facilitate scoring and piercing without damaging the underlying portion of the object to be pierced and scored, said scoring and piercing point being limited by the dull side of the blade.

2. A knife according to claim 1 wherein said blade has a longitudinal slit on its broad side, said slit forming an opening in said blade, the opposing longitudinal edges of said slit being sharpened.

3. A knife according to claim 2 wherein said scoring point is about 0.125" in height.

4. A knife according to claim 3 wherein said scoring point is about 0.5" from the tip of the blade.

5. A knife having a handle and a blade with sharpened and dull substantially smoothed edges, said edges tapering to form a point at the tip of said blade, said dull edge having a point near the tip of said blade for scoring and piercing, said scoring and piercing point defined by opposed tapering straight edges protruding from the dull edge of said blade at a substantially equal angle to facilitate piercing and scoring without damaging the underlying portion of the object to be pierced and scored, said scoring and piercing point being limited by the dull side of said blade, said blade having a longitudinal slit on its broad side, said slit forming an opening in said blade, the opposing longitudinal edges of said slit being sharpened.

6. The knife of claim 5 wherein said scoring point protrudes approximately 0.05 to about 0.5 inches from the dull side of said blade.

* * * * *

UNITED STATES PATENT AND TRADEMARK OFFICE
CERTIFICATE OF CORRECTION

PATENT NO. : 4,163,317
DATED : August 7, 1979
INVENTOR(S) : Levanti

It is certified that error appears in the above-identified patent and that said Letters Patent are hereby corrected as shown below:

In Claim 1, column 4, line 9, "as" should be -- at --.

Signed and Sealed this

Eleventh Day of December 1979

[SEAL]

Attest:

SIDNEY A. DIAMOND

Attesting Officer  Commissioner of Patents and Trademarks